(12) United States Patent
Iwase et al.

(10) Patent No.: US 7,540,158 B2
(45) Date of Patent: Jun. 2, 2009

(54) MULTISTAGE TURBINE WITH SINGLE BLADE ROW, AND GAS TURBINE USING SAME

(75) Inventors: Shiki Iwase, Chofu (JP); Yoshio Saito, Chofu (JP)

(73) Assignee: Japan Aerospace Exploration Agency, Tokyo (JP)

( * ) Notice: Subject to any disclaimer, the term of this patent is extended or adjusted under 35 U.S.C. 154(b) by 505 days.

(21) Appl. No.: 11/395,169

(22) Filed: Apr. 3, 2006

(65) Prior Publication Data
US 2006/0222484 A1    Oct. 5, 2006

(30) Foreign Application Priority Data
Apr. 4, 2005    (JP) .............................. 2005-107211

(51) Int. Cl.
*F02C 3/04*    (2006.01)
(52) U.S. Cl. .............................. 60/805; 60/774; 60/751
(58) Field of Classification Search .................. 60/805, 60/774, 751, 791; 415/193–195, 199.6, 209.1, 415/58.5, 58.7, 57.1, 57.2, 57.3, 58.1
See application file for complete search history.

(56) References Cited
U.S. PATENT DOCUMENTS
2,499,772 A * 3/1950 Osborne ..................... 60/641.1

FOREIGN PATENT DOCUMENTS
JP    6-272619    9/1994
JP    2003-293702    10/2003

* cited by examiner

*Primary Examiner*—Michael Cuff
*Assistant Examiner*—Vikansha S Dwivedi
(74) *Attorney, Agent, or Firm*—Westerman, Hattori, Daniels & Adrian, LLP.

(57) ABSTRACT

In order to desirably prevent leakage of a working fluid from the tip clearance to reduce loss of a heat drop of the working fluid, a first corresponding blade of a second stationary blade row, which corresponds to a first reference blade of a first stationary blade row, is disposed in a position distant by 2L from the position of a lower end of a rotor blade in the direction of movement of the rotor blades when the rotor blade makes the closest approach to a lower end of the first reference blade. It should be noted that L is a value obtained by multiplying the average time T required for the high-pressure working fluid to pass through the rotor blade by the traveling speed U of the rotor blade. On the other hand, a second corresponding blade of the second stationary blade row, which corresponds to a second reference blade of the first stationary blade row, is disposed in a position of a lower end of a rotor blade when the rotor blade makes the closest approach to a lower end of the first reference blade.

2 Claims, 4 Drawing Sheets

MULTISTAGE TURBINE WITH SINGLE BLADE ROW, AND GAS TURBINE USING SAME

BACKGROUND OF THE INVENTION

1. Field of the Invention

The present invention relates to a multistage turbine with a single blade row and a gas turbine, and more particularly to a high-efficiency multistage turbine with a single blade row for desirably preventing leakage of a working fluid from the tip clearance to reduce loss of a heat drop of the working fluid, and a gas turbine using the multistage turbine with a single blade row.

2. Description of the Related Art

The driving mechanism of fans in a general turbine engine is a low pressure turbine which is connected to the rotation axis of a fan. However, as another fan driving method, there is a tip turbine system in which a small turbine rotor blade (referred to as "tip turbine" hereafter) is embedded in a leading end of a fan. In this tip turbine system, a tip turbine is embedded in a circumferential end portion of a fan, thus there are advantages that a rotation axis for connecting a low pressure turbine to the fan is not required, the shaft length of the engine is reduced by the low pressure turbine moving to the circumferential end portion of the fan, and the structure of the engine is significantly simplified.

On the other hand, the hub diameter of the tip turbine inevitably tends to become larger than the diameter of the fan, and the flow passage area of the tip turbine also tends to become large. Therefore, when flow rate of the working fluid for driving the tip turbine is relatively small in proportion as the flow passage area, the height of a tip turbine rotor blade needs to be reduced. However, a radical reduction of the height of the rotor blade causes degradation of performance of the blade, thus conformity of the amount of the working fluid flowing inside the turbine with the flow passage area of the turbine cannot be achieved, a partial turbine or the like in which a tip turbine is disposed in a part of the circumference of fan is used.

Further, circumferential speed of the tip turbine significantly depends on circumferential speed of the fan. Especially when the tip turbine comprises only a single rotor blade row, desired circumferential speed cannot be obtained, and a heat drop required for the tip turbine to drive the fan cannot be absorbed. For this reason, there is known a multistage turbine with plurality of blade rows in which the tip turbine comprises a plurality of rotor blade rows (see, for example, Japanese Patent Application Laid-Open No. H6-272619). Alternatively, when the pressure of the gas for driving the tip turbine rises, the partial tip turbine with multistage rotor blade rows is used.

Incidentally, there is known a multistage turbine with a single blade row, in which the rotor blade row of the tip turbine, without being changed, transmits a working fluid repeatedly, and thereby subjecting the working fluid to adiabatic expansion throughout the multiple stages to absorb a desired heat drop (see, for example, Japanese Patent Application Laid-Open No. 2003-293702). This multistage turbine with a single blade row comprises a mechanism for transmitting the working fluid through the single blade row a number of times, and brings about an operational effect of a multistage turbine, although it has only a single blade row. Therefore, the structure thereof is simpler than when a tip turbine is made to have a plurality of blade rows and multiple stapes, and also its weight can be reduced.

In the above multistage turbine with a single blade row the working fluid is subjected to adiabatic expansion each time when it passes through a row of rotor blades, and its pressure is reduced while applying work to the rotor blade row. For this reason, working fluids of different pressures at both sides of a rotor blade may sometimes flow parallel to each other.

However, when a working fluid of high pressure and a working fluid of low pressure flow parallel to each other, a large quantity of the high-pressure working fluid flows into the low-pressure working fluid via a space between rotor blades (referred to as "tip clearance" hereinafter), whereby a heat drop, which is obtained when a working fluid is subjected to adiabatic expansion when it passes through a rotor blade row, cannot be recovered sufficiently, causing a problem that performance of the tip turbine and therefore performance of the entire blades are degrade.

On the other hand, leakage of the working fluid through the tip clearance largely depends on the conditions of the pressure at downstream of the rotor blade and on the pressure gradient between the rotor blades. Particularly, a rotor blade, which is positioned in a section which starts receiving the high-pressure working fluid from the low-pressure working fluid as this blade rotates, receives high pressure from the suction side of the blade gradually, thus the pressure at the suction side of the blade becomes higher than that at the pressure side of the blade. At this moment, when the downstream of the suction side of the blade is exposed to the working fluid, the fluid on the suction side of the blade tries to flow toward the pressure side of the blade where the pressure is low, and then flow converges into the tip clearance. As a result, a large quantity of the high-pressure working fluid starts to flow toward the pressure side of the blade from the suction side of the blade via the tip clearance, whereby the performance of the blade is degraded significantly. Also, regarding the rotor blade, which is positioned in a section which starts receiving the low-pressure working fluid from the high-pressure working fluid as this blade rotates, a large quantity of the high-pressure working fluid starts to flow toward the suction side of the blade from the pressure side of the blade via the tip clearance for the same reason, whereby the performance of the blade is degraded significantly.

Incidentally, although the above problems can reduce the effect on the rotor blades by increasing the number of the rotor blades, they cause reduction of the chord length, but a radical reduction of the chord length inhibits the aerodynamic function of the turbine.

SUMMARY OF THE INVENTION

The present invention therefore is contrived in view of the above problems of the conventional technology, and an object thereof is to provide a high-efficiency multistage turbine with a single blade row for desirably preventing leakage of a working fluid from the tip clearance to reduce loss of a heat drop of the working fluid, and a gas turbine using the multistage turbine with a single blade row.

In order to achieve the above object, is a multistage turbine with a single blade row for causing a working fluid passing through a rotor blade row to pass through the rotor blade row again, and thereby subjecting the working fluid to adiabatic expansion a number of times to output power, the multistage turbine with a single blade row comprising: a first stationary blade row which causes the working fluid to flow into the rotor blade row while increasing the speed of the working fluid; and a second stationary blade row which is positioned at a downstream of the rotor blade row and separates the working fluid flowing out of the rotor blade row, wherein the second stationary blade row is disposed in relation to reference blades of the first stationary blade row which separate a working fluid of high pressure from a working fluid of low pressure.

Further, in the multistage turbine with a single blade row, by optimizing the placement of the first stationary blade row disposed at an upstream of the rotor blade row and of the second stationary blade row disposed at a downstream of the rotor blade row in a section in which the rotor blade is exposed to the high-pressure working fluid from the low-pressure working fluid or in a section in which the rotor blade is exposed to the low-pressure working fluid from the high-pressure working fluid, pressure gradient on the suction side of the rotor blade and on the pressure side of same can be minimized as much as possible without changing the shape of the rotor blade. Accordingly, the high-pressure working fluid is prevented from leaking from the suction side of rotor blade to the pressure side of same via the tip clearance when being subjected to adiabatic expansion, and loss of a heat drop is desirably reduced at the time of the adiabatic expansion. Further, the second stationary blade row is disposed in relation to the reference blades of the first stationary blade row which separate the high-pressure working fluid and the low-pressure working fluid and thus prevents the high-pressure working fluid from flowing into the low-pressure working fluid at the downstream of the blade row. Accordingly, a high-enthalpy working fluid can be allowed to flow into the rotor blade row again. Further, the speeds of the working fluids are increased by the first stationary blades and thus can be subjected to adiabatic expansion efficiently in the rotor blade row. As a result, energy can be obtained effectively from the working fluids, and energy efficiency is improved.

In a multistage turbine with a single blade row, a first corresponding blade of the second stationary blade row is disposed in the vicinity of the distance, which is determined by an expression $2 \times U \times T$, where T is the time required for the high-pressure working fluid to pass through one of the rotor blades of the rotor blade row and U is traveling speed of the rotor blade in a circumferential direction, with respect to the direction of movement of the rotor blade from a lower end of the rotor blade when the rotor blade makes the closest approach to the first reference blade, the first corresponding blade being disposed in relation to the first reference blade which is positioned so that the high-pressure working fluid flows in parallel with and preceding the low-pressure working fluid with respect to a direction of movement of the rotor blade row.

The time required for the high-pressure working fluid flowing out of the first reference blades to fill the suction side of the rotor blade is T, and the time required for this high-pressure fluid to continuously fill the pressure side of the rotor blade is T. Therefore, when the rotor blade moves from the lower end of the first reference blade by a distance of $U \times (T+T) = U \times 2T = 2 \times U \times T = 2 \times L$ (where $L = U \times T$), the high-pressure working fluid fills the suction side and pressure side of the rotor blade, and pressure gradient on the suction side of the rotor blade and on the pressure side of same are minimized as much as possible.

In a multistage turbine with a single blade row, a first corresponding blade of the second stationary blade row is disposed in the vicinity of the distance, which is determined by an expression $2 \times U \times T$, where T is the time required for the high pressure working to pass through one of the rotor blades of the rotor blade row and U is traveling speed of the rotor blade in a circumferential direction, with respect to the direction of movement of the rotor blade from a lower end of the rotor blade when the rotor blade makes the closest approach to the first reference blade, the first corresponding blade being disposed in relation to the first reference blade which is positioned so that the high-pressure working fluid flows in parallel with and preceding the low-pressure working fluid with respect to a direction of movement of the rotor blade row.

In a multistage turbine with a single blade row, a second corresponding blade of the second stationary blade row is disposed in the vicinity of a lower end of one of the rotor blades of the rotor blade row when the rotor blade makes the closes approach to a lower end of a second reference blade, the second corresponding blade being disposed in relation to the second reference blade which is positioned so that the high-pressure working fluid flows in parallel with and following the low-pressure working fluid with respect to a direction of movement of the rotor blade row.

When the rotor blade moves even a little bit from a position where the rotor blade made the closest approach to the lower end of the second reference blade, pressure on an outlet side (downstream side) of the pressure side of the rotor blade is reduced, as a result of which the high-pressure working fluid flows along the rotor blade toward the outlet side (downstream side) of the rotor blade where pressure is lower, rather than leaking to the suction side of the rotor blade through the tip clearance in which the flow passage is narrow.

Therefore, in the multistage turbine with a single blade row, the second corresponding blade of the second stationary blade row is disposed in the vicinity of the lower end of the rotor blade when the rotor blade makes the closest approach to the lower end of the second reference blade. Accordingly, the high-pressure working fluid is prevented from leaking from the pressure side of rotor blade to the suction side of same via the tip clearance, and loss of a heat drop occurring at the time of adiabatic expansion of the high-pressure working fluid is desirably reduced.

In order to achieve the above-described object of the present invention, a gas turbine is a gas turbine for outputting power by mixing an oxidant subjected to adiabatic compression with fuel, burning the mixture to obtain a working fluid of high temperature and high pressure, and thereafter subjecting the working fluid to adiabatic expansion by means of a turbine, wherein the turbine is the multistage turbine with a single blade row of the abovementioned first invention.

In the gas turbine, the multistage turbine with a single blade row is used, thus supplied energy is desirably recovered by the multistage turbine with a single blade row, and energy efficiency of the gas turbine is improved. Moreover, a rotation axis for transmitting power to the fan or compressor is no longer required, thus the structure of the gas turbine is simplified, such that the length of the axis of the gas turbine is reduced and the weight of same is also reduced.

According to the multistage turbine with a single blade row, the first corresponding blade and the second corresponding blade configuring the second stationary blade row are disposed in relation to the first reference blade and the second reference blade of a first stationary blade row 2 respectively. Particularly, in a section in which a rotor blade is exposed to the high-pressure working fluid from the low-pressure working fluid, the first corresponding blade is disposed so that pressure gradient on the suction side of the rotor blade and on the pressure side of same are minimized as much as possible when the rotor blade makes the closest approach to an upper end of the first corresponding blade. In a section in which the rotor blade is exposed to the low-pressure working fluid from the high-pressure working fluid, on the other hand, the second corresponding blade is disposed so that the high-pressure working fluid flows along the pressure side of the rotor blade toward the downstream side of the rotor blade. As a result, leakage of the high-pressure working fluid from the tip clearance can be desirably prevented, and a large heat drop can be obtained when the working fluids pass through the rotor blade row. Accordingly, without changing the shape and the like of the rotor blade, energy can be efficiently recovered from the working fluids by optimizing the arrangement in the first stationary blade row located on the upstream side of the rotor blade row and the arrangement of the second stationary blade row located on the downstream side of same.

In addition, according to the gas turbine of the present invention, the multistage turbine with a single blade row of the abovementioned invention is used, thus supplied energy is desirably recovered by the multistage turbine with a single blade row, and energy efficiency of the gas turbine is improved. Moreover, a rotation axis for transmitting power to the fan or compressor is no longer required, thus the structure of the gas turbine is simplified, such that the length of the axis of the gas turbine is reduced and the weight of same is also reduced.

DESCRIPTION OF THE PREFERRED EMBODIMENTS

Hereinafter, the present invention is described in detail using the embodiments shown in the figures.

Figure 1:
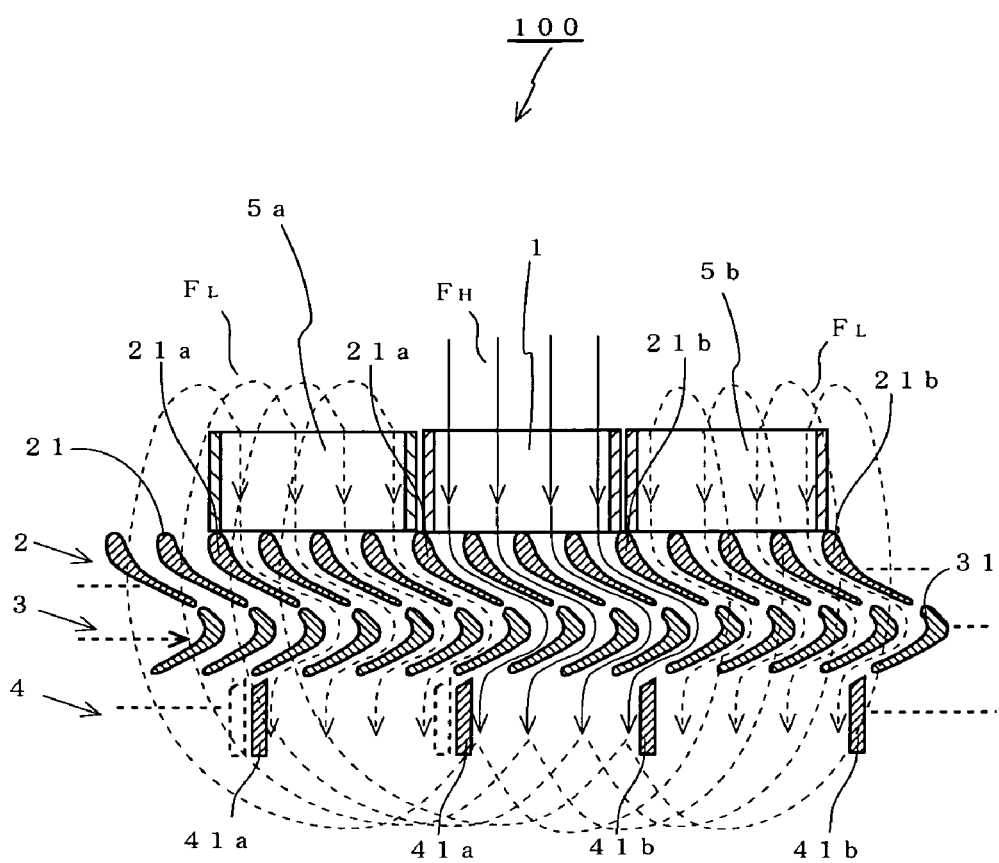
FIG. 1 is a cross-section diagram of a substantial part, which shows an embodiment of the multistage turbine with a single blade row according to the present invention.

FIG. 1 is a cross-section diagram of a substantial part, which shows an embodiment of the multistage turbine with a single blade row according to the present invention. This cross-section diagram of a substantial part is to show a substantial part of the multistage turbine with a single blade row of the present invention in the form of a two-dimensional development, the substantial part being obtained by cutting the multistage turbine with a single blade row at its cylindrical surface.

This multistage turbine with a single blade row 100 comprises a high-pressure side suction duct 1 into which a high-pressure working fluid $F_H$ flows, a first stationary blade row 2 which functions as a nozzle for increasing the speed of working fluids, a rotor blade row 3 in which the working fluids pass through between the blades while being subjected to adiabatic expansion, a second stationary blade 4 which functions as a partition wall for allowing the working fluids, which is subjected to adiabatic expansion, to flow backwards and for separating the working fluids of different enthalpies, and a low-pressure side suction duct 5a, 5b into which the high-pressure working fluid $F_H$, which has passed through the rotor blade row 3, flows as a low-pressure working fluid $F_L$ in order to pass through the rotor blade row 3 again. Positioning of a second stationary blade row 4 is described hereinafter with reference to FIG. 2 and FIG. 3.

The first stationary blade row 2 is configured such that a plurality of first stationary blades 21 are attached on an inner peripheral surface of, for example, a casing (not shown) so that the spaces between the first stationary blades are equal with respect to the rotor blade row 3 and that the clearance between the first stationary blades 21 and the rotor blade row 3 is minimum. The first stationary blade row 2 allows the high-pressure working fluid $F_H$, which has flowed into the first stationary blade row 2, to flow into the rotor blade row 3 after increasing the speed of the high-pressure working fluid $F_H$ to raise kinetic energy. Particularly, when a stationary blade which separates the high-pressure working fluid $F_H$ and the low-pressure working fluid $F_L$ in the first stationary blades 21 is taken as a reference blade, a reference blade, which is disposed so that the high-pressure working fluid $F_H$ flows in parallel with and preceding the low-pressure working fluid $F_L$ with respect to a direction of movement of the rotor blades (the rotor blades are exposed to the high-pressure working fluid from the low-pressure working fluid), is defined as a first reference blade 21a, and a reference blade, which is disposed so that the high-pressure working fluid $F_H$ flows in parallel with and following the low-pressure working fluid $F_L$ with respect to the direction of movement of the rotor blade row (the rotor blades are exposed to the low-pressure working fluid from the high-pressure working fluid), is defined as a second reference blade 21b.

The rotor blade row 3 is configured such that a plurality of rotor blades 31 are attached on an external end portion of, for example, a fan (not shown) so that the spaces between the rotor blades are equal with respect to the first stationary blade row 2 and that the clearance between the rotor blades 31 and a section of the stationary blade row 2 and a second stationary blade row 4 is minimum. Furthermore, the high-pressure working fluid $F_H$, which has flowed in from the first stationary blade row 2, flows out as the low-pressure working fluid $F_L$ to a downstream side while being subjected to adiabatic expansion between the rotor blades, and, as a reaction of the adiabatic expansion of the working fluid, torque is generated on the rotor blade row 3. The high-pressure working fluid is continuously supplied from the first stationary blade row 2 and continuously subjected to adiabatic expansion between the rotor blades, whereby rotation power is generated on the rotor blade row 3, and the fan (not shown) is driven by the rotation power.

The second stationary blade row 4 comprises a first corresponding blade 41a corresponding to the first reference blade 21a, and a second corresponding blade 41b corresponding to the second reference blade 21b, functions as a partition wall separating the working fluids of different enthalpies such as the high-pressure working fluid $F_H$ and low-pressure working fluid $F_L$ flowing out of the rotor blade row 3, and is attached on the inner peripheral surface of the casing (not shown) so as to correspond to the first reference blade 21a and second reference blade 21b and so that the clearance between the second stationary blade row 4 and the rotor blade row 3 is minimum. It should be noted that the detail of this blade row is described with reference to FIG. 2 and FIG. 3. By appropriately disposing the first corresponding blade 41a and the second corresponding blade 41b, loss of a heat drop occurring at the time of adiabatic expansion of the working fluid is desirably reduced, and large work can be extracted at the rotor blade row 3.

The high-pressure side suction duct 1 is an intake into which the high-pressure working fluid $F_H$, i.e. a high-temperature/high-pressure combustion gas from, for example, a combustor (not shown), flows.

The low-pressure side suction duct 5a, 5b is an intake into the low-pressure working fluid $F_L$, i.e. a working fluid in which the enthalpy is reduced after the high-temperature/high-pressure combustion gas from, for example, the combustor (not shown) is subjected to adiabatic expansion, flows. The working fluid, which is subjected to adiabatic expansion at the rotor blade row 3, holds high enthalpy even after applying work to the rotor blade row 3. Therefore, in order to sufficiently recover the energy held by the working fluid, the working fluid is caused to flow into the low-pressure side suction duct 5a, 5b via an exhaust-side duct (not shown) and a return duct (not shown), and to pass through the first stationary blade row 2 and the rotor blade row 3 again, whereby work can be extracted from the rotor blade row 3. In this manner, by allowing the working fluid to pass through the first stationary blade row 2 and the rotor blade row 3 a number of times (through multiple stages), the energy held by the working fluid can be recovered efficiently as mechanical energy.

Figure 2:
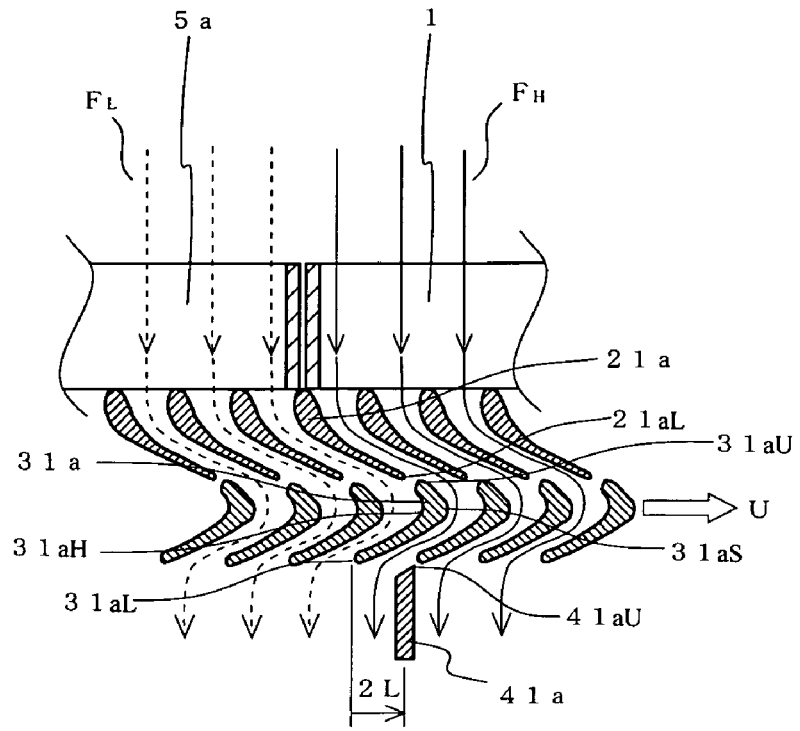
FIG. 2 is a cross-sectional explanatory diagram of a substantial part, which shows an arrangement of a first corresponding blade.

FIG. 2 is a cross-sectional explanatory diagram of a substantial part, which shows an arrangement of the first corresponding blade 41a.

The first corresponding blade 41a is disposed in a position corresponding to the distance, 2×L, from the position of a lower end 31aL of the rotor blade 31 toward the direction of movement of the rotor blades when an upper end 31aU of one rotor blade 31a makes the closest approach to a lower end 21aL of the first reference blade 21a. It should be noted that L is a value obtained by multiplying the average time T required for the high-pressure working fluid $F_H$ to pass through the rotor blade 31a by the traveling speed U of the rotor blades. The average time T can be computed in a numerical calculation or obtained in an experiment.

Once the first corresponding blade 41a corresponding to the first reference blade 21a is disposed in the manner described above, when the rotor blade 31a, which has made the closest approach to the lower end 21aL of the first reference blade 21a, makes the closest approach to the first corresponding blade 41a, the suction side 31aS and pressure side 31aH of the rotor blade are filled with the high-pressure working fluid $F_H$. The time required for the high-pressure working fluid $F_H$ to fill the suction side 31aS and the pressure side 31aH is 2×T. Therefore, when the rotor blade 31a passes through the lower end 21aL of the first reference blade to make the closest approach to the upper end 41aU of the first corresponding blade, i.e. when the rotor blade 31a moves from the lower end 21aL of the first reference blade by a distance of U×2T=2×U×T=2×L, the high-pressure working fluid $F_H$ fills the entire suction side 31aS and pressure side 31aH, whereby the pressure gradient on the suction side 31aS and on the pressure side 31aH are minimized as much as possible. Accordingly, the high-pressure working fluid $F_H$ is prevented from leaking from the suction side 31aS of rotor blade 31a to the pressure side 31aH of same via the tip clearance, and loss of a heat drop occurring at the time of adiabatic expansion of the high-pressure working fluid is desirably reduced.

It should be noted that it is preferred that the distance d1 between the upper end 31aU of the rotor blade and the lower end 21aL of the first reference blade, and the distance d2 between the lower end 31aL of the rotor blade and the upper end 41aU of the first corresponding blade be small. When d1 becomes large, $\Delta L1=d1\times(Vq1/Va1)$ may be calculated using axial velocity Va1 and absolute circumferential velocity Vq1 obtained immediately after the high-pressure working fluid $F_H$ flows out of the first reference blade, to move the first corresponding blade 41a by $\Delta L1$.

On the other hand, when d2 becomes large, similarly, $\Delta L2=d2\times(Vq2/Va2)$ may be calculated using axial velocity Va2 and absolute circumferential velocity Vq2 obtained immediately after the high-pressure working fluid $F_H$ flows out of the rotor blade, to move the first corresponding blade 41a by $\Delta L2$ in accordance with the sign of Vq2.

Figure 3:
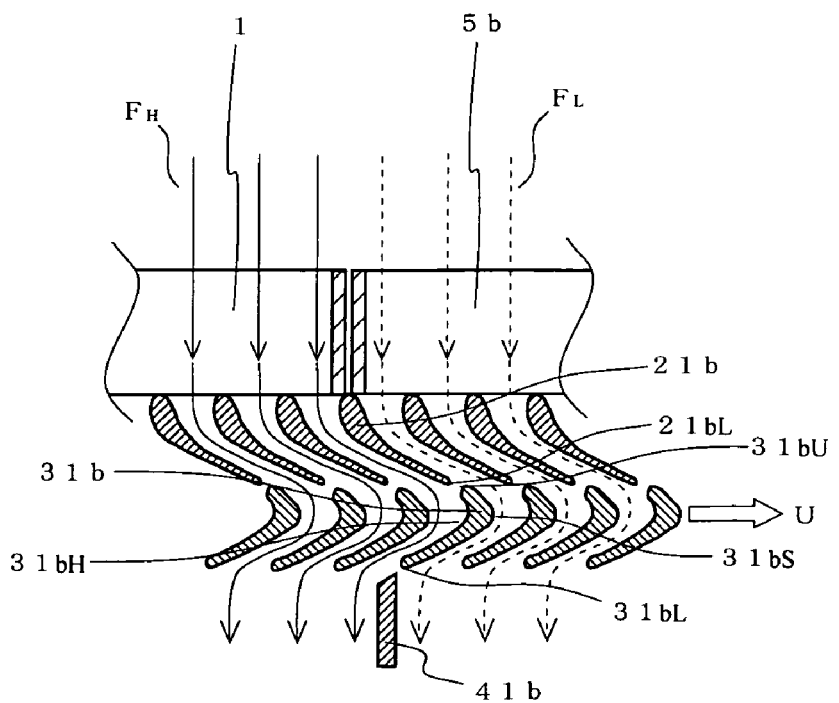
FIG. 3 is a cross-sectional explanatory diagram of a substantial part, which shows an arrangement of a second corresponding blade.

Further, FIG. 3 is a cross-sectional explanatory diagram of a substantial part, which shows an arrangement of the second corresponding blade 41b.

The second corresponding blade 41b is disposed in a position of a lower end 31bL of a rotor blade 31b when an upper end 31bU of the rotor blade 31b makes the closest approach to a lower end 21bL of the second reference blade 21b.

Once the second corresponding blade 41b corresponding to the second reference blade 21b is disposed in the manner described above, pressure at the downstream side of the lower end 31bL of the rotor blade which has made the closest approach to the lower end 21bL of the second reference blade 21b is reduced with time. As a result, the high-pressure working fluid $F_H$ on a pressure side 31bH of the rotor blade flows toward an outlet side of the low-pressure working fluid $F_L$, which is separated by the second corresponding blade 41b where pressure is lower, rather than flowing to a suction side 31bS of the rotor blade through the tip clearance in which the flow passage is narrow, and a flow of the high-pressure working fluid according to the shape of the pressure side 31bH is realized on the rotor blade which makes the closest approach to the lower end 21bL of the second reference blade 21b. Accordingly, the high-pressure working fluid $F_H$ is prevented from leaking from the pressure side 31bH of rotor blade 31b to the suction side 31bS of same via the tip clearance, and loss of a heat drop occurring at the time of adiabatic expansion of the high-pressure working fluid is desirably reduced.

Figure 4:
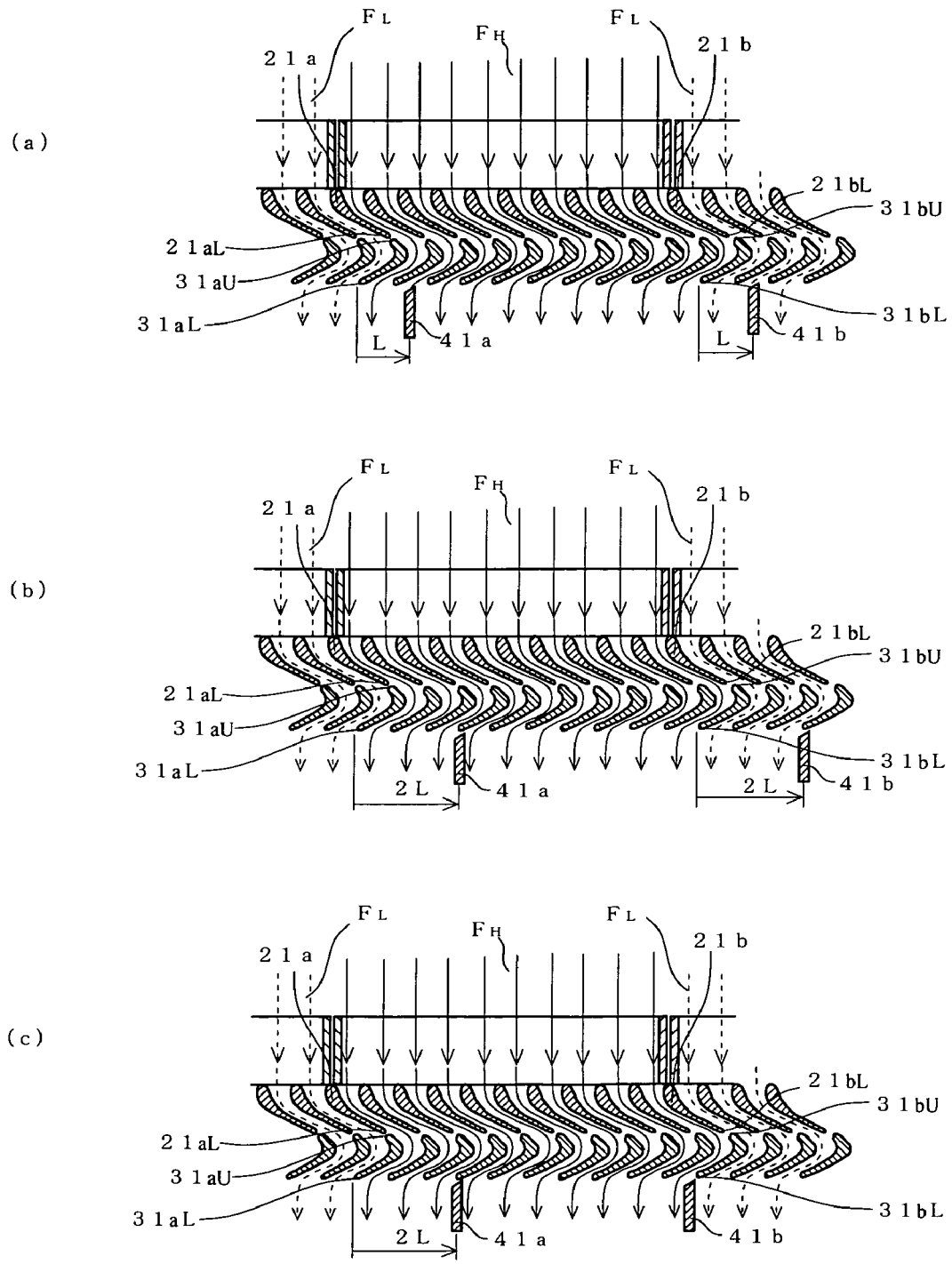
FIG. 4 is a cross-sectional explanatory diagram of a substantial part, which shows an arrangement of a second stationary blade row and another arrangement for confirming the effects of the present invention.

FIG. 4 is a cross-sectional explanatory diagram of a substantial part, which shows an arrangement of the second stationary blade row 4 and another arrangement for confirming the effects of the present invention.

In FIG. 4A, the first corresponding blade 41a is disposed in a position corresponding to the distance, L, from the position of a lower end 31aL of one rotor blade toward the direction of movement of the rotor blades when the upper end 31aU of the rotor blade makes the closest approach to the lower end 21aL of the first reference blade. On the other hand, in the same figure the second corresponding blade 41b is disposed in a position corresponding to the distance, L, from the position of the lower end 31bL of one rotor blade toward the direction of movement of the rotor blades when the upper end 31bU of the rotor blade makes the closest approach to the lower end 21bL of the second reference blade.

In FIG. 4B, the first corresponding blade 41a is disposed in a position corresponding to the distance, 2L, from the position of the lower end 31aL of one rotor blade toward the direction of movement of the rotor blades when the upper end 31aU of the rotor blade makes the closest approach to the lower end 21aL of the first reference blade. On the other hand, in the same figure the second corresponding blade 41b is disposed in a position corresponding to the distance, again 2L, from the position of the lower end 31bL of one rotor blade toward the direction of movement of the rotor blades when the upper end 31bU of the rotor blade makes the closest approach to the lower end 21bL of the second reference blade.

FIG. 4C shows an arrangement of the second stationary blade row 4 of the multistage turbine with a single blade row 100, in which the first corresponding blade 41a is disposed in a position corresponding to the distance, 2L, from the position of the lower end 31bL of one rotor blade toward the direction of movement of the rotor blades when the upper end 31aU of the rotor blade makes the closest approach to the lower end 21aL of the first reference blade. On the other hand, in the same figure the second corresponding blade 41b is disposed in a position of the lower end 31bL of one rotor blade when the upper end 31bU of the rotor blade makes the closest approach to the lower end 21bL of the second reference blade.

Here, a three-dimensional numerical analysis of a heat drop at the time of adiabatic expansion of the working fluid is carried out in consideration of viscosity of the working fluid, by means of the shape of each of the arrangements shown in FIG. 4A through FIG. 4C. The shape is such that the turbine hub diameter is 270 mm, the turbine blade height is approximately 5 mm, and the rotation speed of the rotor blades is 16800 rpm. Furthermore, the same shape is repeatedly used periodically in the circumferential directions of the rotor and stationary blades. It should be noted that the following equation (1) is used to obtain a heat drop $H_T$:

$$H_T = C_P \times (T_{in} - T_{out}) \qquad (1)$$

Here, $C_P$ is specific heat at constant pressure, $T_{in}$ is the mass averaged total temperature of flowing-in fluid, and $T_{out}$ is the mass averaged total temperature of flowing-out fluid.

Figure 5:
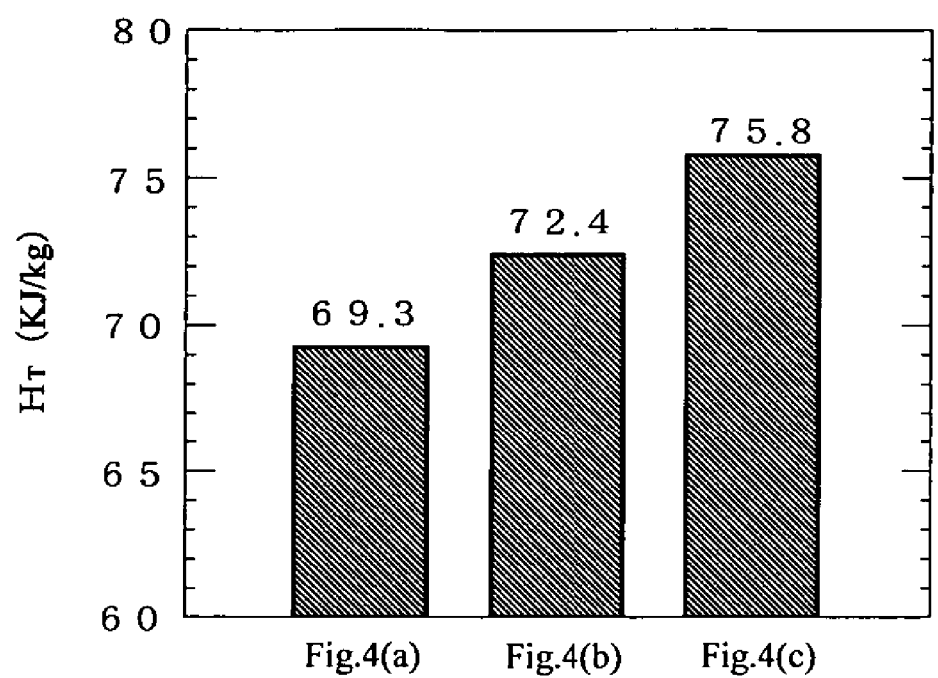
FIG. 5 is a graph showing a result of an analysis on each of the arrangements shown in FIG. 4.

FIG. 5 is a graph showing a result of an analysis on each of the arrangements shown in FIG. 4.

As can be understood from this graph, it has been confirmed that the highest heat drop $H_T$ was obtained in the arrangement of the second stationary blade row 4 of the present invention. Particularly, it has been confirmed that the effects of the present invention were prominently observed in the vicinity of the first reference blade 21a in which the rotor blades receive the flow of the high-pressure fluid from the low-pressure fluid according to time, and in the vicinity of the second reference blade 21b in which the rotor blades receive the flow of the low-pressure fluid from the high-pressure fluid according to time.

According to the multistage turbine with a single blade row 100, the first corresponding blade 41a and the second corresponding blade 41b configuring the second stationary blade row 4 are disposed in relation to the first reference blade 21a and the second reference blade 21b of the first stationary blade row 2 respectively. Particularly, in a section in which the rotor blade 31a is exposed to the high-pressure working fluid $F_H$ from the low-pressure working fluid $F_L$, the first corresponding blade 41a is disposed so that pressure gradient on the suction side 31aS of the rotor blade 31a and on the pressure side 31aH of same are minimized as much as possible when the rotor blade 31a makes the closest approach to the upper end 41aU of the first corresponding blade 41a. In a section in which the rotor blade 31b is exposed to the low-pressure working fluid $F_L$ from the high-pressure working fluid $F_H$, on the other hand, the second corresponding blade 41b is disposed so that the high-pressure working fluid $F_H$ on the pressure side 31bH of the rotor blade 31b flows along the pressure side 31bH of the rotor blade 31b. As a result, leakage of the high-pressure working fluid $F_H$ from the tip clearance can be desirably prevented, and a large heat drop can be obtained when the working fluids pass through the rotor blade row 3. Accordingly, without changing the shape and the like of the rotor blades 31, energy can be efficiently recovered from the working fluids by optimizing the arrangement in the first stationary blade row 2 located on the upstream side of the rotor blade row 3 and the arrangement in the second stationary blade row 4 located on the downstream side of same.

In addition, according to the gas turbine of the present invention, the multistage turbine with a single blade row 100 of the abovementioned invention is used, thus supplied energy is desirably recovered by the multistage turbine with a single blade row 100, and energy efficiency of the gas turbine is improved. Moreover, a rotation axis for transmitting power to the fan or compressor is no longer required, thus the structure of the gas turbine is simplified, such that the length of the axis of the gas turbine is reduced and the weight of same is also reduced.

The multistage turbine with a single blade row of the present invention can be appropriately applied to a gas turbine engine for aircraft, for marine use, or for a generator, and also to a fluid machinery for converting fluid energy from a steam turbine such as a heat power plant into mechanical energy.

What is claimed is:

1. A multistage turbine with a single rotor blade row for causing a working fluid passing through a rotor blade row (3) to pass through the rotor blade row (3) again, and thereby subjecting the working fluid to adiabatic expansion a number of times to output power, the multistage turbine with the single rotor blade row comprising:

a first stationary blade row (2) which is positioned at an upstream of the rotor blade row (3) and causes the working fluid to flow into the rotor blade row (3) while increasing the speed of the working fluid; and a second stationary blade row (4) which is positioned at a downstream of the rotor blade row (3) and separates the working fluid flowing out of the rotor blade row (3), wherein, when stationary blades which separate the high-pressure working fluid ($F_H$) and the low-pressure working fluid ($F_L$) in the first stationary blade row are taken as reference blades and some of the reference blades, which are disposed so that the high-pressure working fluid ($F_H$) flows in parallel with and preceding the low-pressure working fluid ($F_L$) with respect to a direction of movement of the rotor blade row (3) are defined as a first reference blade (21a) respectively and some of the reference blades, which are disposed so that the high-pressure working fluid ($F_H$) flows in parallel with and following the low-pressure working fluid ($F_L$) with respect to the direction of movement of the rotor blade row (3) are defined as a second reference blade (21b) respectively, the multistage turbine being characterized in that:

a first corresponding blade (41a) of the second stationary blade row in relation to one of the first reference blades (21a) is disposed in the vicinity of the distance, which is determined by an expression 2×U×T, where T is the time required for the high-pressure working fluid to pass through one of the rotor blades of the rotor blade row (3) and U is traveling speed of the rotor blade in a circumferential direction, with respect to the direction of movement of the rotor blade (31) from a lower end of the rotor blade when the rotor blade makes the closest approach to the first reference blade (21a), and wherein a second corresponding blade (41b) of the second stationary blade row in relation to one of the second reference blades (21b) is disposed in the vicinity of a lower end of one of the rotor blades of the rotor blade row (3) when the rotor blade makes the closest approach to a lower end of the second reference blade (21b).

2. A gas turbine for outputting power by mixing a working fluid as an oxidant, which is subjected to adiabatic compression, with fuel, burning the mixture to obtain a working fluid of high temperature and high pressure, and thereafter subjecting the working fluid to adiabatic expansion by means of a turbine, wherein the turbine is the multistage turbine with the single rotor blade row according to claim 1.

* * * * *